United States Patent
Arakawa

(10) Patent No.: US 9,616,777 B2
(45) Date of Patent: Apr. 11, 2017

(54) VEHICLE SEAT

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa (JP)

(72) Inventor: Yuji Arakawa, Aichi-ken (JP)

(73) Assignees: TOYOTA BOSHOKU KABUSHIKI KAISHA, Aichi-Ken (JP); AISIN SEIKI KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/492,767

(22) Filed: Sep. 22, 2014

(65) Prior Publication Data

US 2015/0090853 A1    Apr. 2, 2015

(30) Foreign Application Priority Data

Sep. 30, 2013  (JP) ................. 2013-203576

(51) Int. Cl.
*B60N 2/07* (2006.01)
*B60N 2/08* (2006.01)

(52) U.S. Cl.
CPC ........... *B60N 2/073* (2013.01); *B60N 2/0705* (2013.01); *B60N 2/0715* (2013.01);
(Continued)

(58) Field of Classification Search
CPC .... B60N 2/0705; B60N 2/0725; B60N 2/073; B60N 2/08; B60N 2/0812; B60N 2/0818;
(Continued)

(56) References Cited

U.S. PATENT DOCUMENTS 3,013,849 A * 12/1961 Tanner ........................... 384/18
6,676,099 B2 * 1/2004 Mallard et al. ............... 248/429
(Continued)

FOREIGN PATENT DOCUMENTS

CN    101678782    3/2010
CN    101722869    6/2010
(Continued)

OTHER PUBLICATIONS

U.S. Appl. No. 14/494,074 to Naoki Hayashi, filed Sep. 23, 2014.
(Continued)

*Primary Examiner* — Jonathan Liu
*Assistant Examiner* — Guang H Guan
(74) *Attorney, Agent, or Firm* — Greenblum & Bernstein, P.L.C.

(57) ABSTRACT

A vehicle seat includes a slide rail. A cap provided in an upper rail integrally includes a base portion adjacent to a longitudinal rear end of the upper rail provided with the cap, and a first deformation prevention portion extending into a space from the base portion toward a longitudinal center of the upper rail provided with the cap, the first deformation prevention portion being provided between the pair of side face portions within the space so as to restrain deformation of the upper rail. When the upper rail is placed in a rearmost position within a slidable range, the first deformation prevention portion is placed in vicinity to the rear end of the lower rail.

12 Claims, 10 Drawing Sheets

(52) U.S. Cl.
CPC ......... *B60N 2/0725* (2013.01); *B60N 2/0732* (2013.01); *B60N 2/0818* (2013.01); *B60N 2/0875* (2013.01); *B60N 2/0881* (2013.01)

(58) Field of Classification Search
CPC .. B60N 2/0837; B60N 2/0856; B60N 2/0862; B60N 2/0875; B60N 2/0881; B60N 2/0887
USPC ......... 248/424, 429, 430, 419, 420; 296/65.13–65.15; 297/344.1, 344.11
See application file for complete search history.

(56) References Cited

U.S. PATENT DOCUMENTS

| | | | | |
|---|---|---|---|---|
| 6,820,851 | B2* | 11/2004 | Mochizuki | B60N 2/067 248/429 |
| 7,422,186 | B2* | 9/2008 | Kropfreiter | B60N 2/067 248/424 |
| 7,814,637 | B2* | 10/2010 | Terada | B60N 2/0224 174/113 R |
| 7,992,834 | B2* | 8/2011 | Kojima et al. | 248/429 |
| 8,469,328 | B2* | 6/2013 | Nakamura | B60N 2/0705 248/424 |
| 8,474,777 | B2* | 7/2013 | Nihonmatsu et al. | 248/429 |
| 8,925,889 | B2* | 1/2015 | Nagura et al. | 248/429 |
| 9,469,217 | B2* | 10/2016 | Hayashi | B60N 2/0705 |
| 2002/0070594 | A1 | 6/2002 | Mochizuki et al. | |
| 2010/0090083 | A1 | 4/2010 | Kojima et al. | |
| 2012/0256074 | A1* | 10/2012 | Garotte | 248/429 |
| 2015/0090853 | A1* | 4/2015 | Arakawa | B60N 2/0705 248/429 |
| 2015/0090854 | A1* | 4/2015 | Hayashi | B60N 2/0705 248/429 |
| 2015/0090855 | A1* | 4/2015 | Arakawa | B60N 2/07 248/429 |

FOREIGN PATENT DOCUMENTS

| | | | |
|---|---|---|---|
| CN | 102476595 | 5/2012 | |
| CN | 102951046 | 3/2013 | |
| DE | 41 05 231 | 9/1992 | |
| EP | 2 177 391 | 4/2010 | |
| FR | 2746721 A1 * | 10/1997 | ......... B60N 2/0705 |
| JP | 09-002109 | 1/1997 | |

OTHER PUBLICATIONS

German Official Action with English-language translation for DE 10 2014 219 171.8, issued on Sep. 15, 2015.
Chinese Office Action for CN App. No. 201410503919.2 dated Apr. 6, 2016, along with English-language translation thereof.
Chinese Office Action for CN App. No. 201410503919.2 mailed on Nov. 30, 2016, along with English-language translation thereof.

* cited by examiner

VEHICLE SEAT

INCORPORATION BY REFERENCE

The disclosure of Japanese Patent Application No. 2013-203576 filed on Sep. 30, 2013 including the specification, drawings and abstract is incorporated herein by reference in its entirety.

BACKGROUND OF THE INVENTION

1. Field of the Invention

The present invention relates to a vehicle seat.

2. Description of Related Art

Japanese Patent Application Publication No. 9-2109 (JP 9-2109 A) has been known as a vehicle seat including: a slide rail including a lower rail disposed on a vehicle component side such as a floor of a vehicle, and an upper rail disposed on a seat body side and supported by the lower rail so as to be movable in a sliding manner; and a cap provided in a longitudinal end of at least one of the lower rail and the upper rail. JP 9-2109 A describes a technique in which a synthetic-resin cap body fitted to a rear end of the lower rail having a U-shaped section includes a steel plate to be disposed between right and left side portions of the lower rail. In the technique in JP 9-2109 A, the synthetic-resin cap body is fitted to the rear end of the lower rail, so that the cap protects a rail end. Further, when a large load is applied to the slide rail due to a vehicle collision or the like, the large load is applied in a direction where the lower rail and the upper rail are separated from each other, which causes such a concern that the lower rail and the upper rail are deformed from their original shapes. Here, in the slide rail in JP 9-2109 A, when a large load is applied in the direction where the lower rail and the upper rail are separated from each other, the right and left side portions of the U-shaped lower rail are deformed so as to come closer to each other in a tapered manner, and move away from the upper rail. In view of this, in order to prevent deformation of the slide rail, the steel plate is provided between the right and left side portions of the U-shaped lower rail so as to restrain deformation of the lower rail. Note that JP 9-2109 A deals with an example in which the U-shaped rail is provided as the lower rail. In addition to this, there may be such an aspect in which the rail configurations in JP 9-2109 A may be provided in a reverse manner. In this case, the U-shaped rail is provided as an upper rail, and when a large load is applied to a slide rail, right and left side portions of the U-shaped upper rail exhibits such a deformation behavior that they are deformed so as to come closer to each other in a tapered manner.

SUMMARY OF THE INVENTION

However, the cap described in JP 9-2109 A has such a concern that a steel plate is provided therein so that its weight may increase. Further, the cap is constituted by a plurality of components including a synthetic-resin cap body, and a steel plate. That is, since the cap is constituted by a plurality of different materials, there is such a concern about an increase of material cost and complicated parts control.

The present invention provides a vehicle seat including a slide rail that realizes protection of that end of a rail which is provided with a cap, prevention of deformation of the rail, and restraint of the number of components.

A vehicle seat according to an aspect of the present invention is a vehicle seat including a slide rail. The slide rail includes: a lower rail disposed on a vehicle component side; an upper rail disposed on a seat body side and supported by the lower rail so as to be movable in a sliding manner; and a cap provided in a longitudinal end of at least one of the lower rail and the upper rail. The slide rail has a space surrounded by a lower face portion of the lower rail which faces the vehicle component side, a upper face portion of the upper rail which faces the seat body side, and a pair of side face portions of the lower rail or the upper rail. When the upper rail is placed in a rearmost position within a slidable range where the upper rail is movable in a sliding manner relative to the lower rail, the slide rail has a positional relationship in which a rear end of the upper rail is placed on a rear side relative to a rear end of the lower rail. The cap provided in the lower rail or the upper rail integrally includes a base portion adjacent to a longitudinal rear end of the lower rail or the upper rail provided with the cap, and a first deformation prevention portion extending into the space from the base portion toward a longitudinal center of the lower rail or the upper rail provided with the cap, the first deformation prevention portion being provided between the pair of side face portions within the space so as to restrain deformation of the rail. When the upper rail is placed in the rearmost position within the slidable range, the first deformation prevention portion is placed in vicinity to the rear end of the lower rail.

According to the above aspect, the cap includes the base portion adjacent to the longitudinal rear end of the lower rail or the upper rail provided with the cap, thereby making it possible to protect the end of the rail. Further, the first deformation prevention portion is provided between the pair of side face portions within the space surrounded by the lower face portion of the lower rail, the upper face portion of the upper rail, and the pair of side face portions of either one of the lower rail and the upper rail. Here, when a large load is applied to the slide rail due to a vehicle collision or the like so that the seat body falls forward and the lower rail and the upper rail move away from the rear side due to the large load the pair of side face portions is deformed so as to come close to each other. In view of this, the first deformation prevention portion restrains the deformation of the pair of side face portions, so as to restrain the deformation of the rail. Further, the base portion and the first deformation prevention portion are provided integrally, thereby making it possible to restrain the number of components. Further, when the upper rail is placed in the rearmost position within the slidable range where the upper rail is movable in a sliding manner relative to the lower rail, the slide rail has a positional relationship in which the rear end of the upper rail is placed on a rear side relative to the rear end of the lower rail. At this time, if the lower rail and the upper rail move away from the rear side due to a vehicle collision or the like, the rear end of the lower rail is deformed markedly. In view of this, when the upper rail is placed in the rearmost position within the slidable range, the first deformation prevention portion is placed in vicinity to the rear end of the lower rail. Thus, the first deformation prevention portion is disposed in a desirable position in terms of restraining the deformation of the rail.

In the above aspect, when the upper rail is placed in the rearmost position within the slidable range, the first deformation prevention portion may be disposed so as to longitudinally overlap with at least part of a fixing area between the rear end of the lower rail and a fixing member fixing a rear-end side of the lower rail to the vehicle component.

According to the above configuration, when the upper rail is placed in the rearmost position within the slidable range, the first deformation prevention portion is disposed so as to longitudinally overlap with at least part of the fixing area between the rear end of the lower rail and the fixing member fixing the rear-end side of the lower rail to the vehicle component. Accordingly, the first deformation prevention portion is disposed in a further desirable position in terms of restraining the deformation of the rail.

Further, in the above aspect, the first deformation prevention portion may be disposed so as to longitudinally overlap with at least part of an attachment area where the seat body is attached to the upper face portion of the upper rail.

According to the above configuration, the first deformation prevention portion is disposed so as to longitudinally overlap with at least part of the attachment area where the seat body is attached to the upper face portion of the upper rail. At the time when a large load is applied to the slide rail due to a vehicle collision or the like so that the seat body falls forward, a transmission path of the load is the attachment area where the seat body is attached to the upper face portion of the upper rail. Accordingly, when the first deformation prevention portion is disposed in the aforementioned area serving as an origin of the deformation, it is further possible to restrain the deformation of the rail.

Further, in the above aspect, the base portion may be provided with a second deformation prevention portion restraining deformation of the longitudinal rear end of the lower rail or the upper rail.

According to the above configuration, when the base portion in the cap is provided with the second deformation prevention portion restraining the deformation of the longitudinal rear end of the lower rail or the upper rail, it is further possible to restrain the deformation of the rail.

According to the aspect of the present invention, it is possible to provide a vehicle seat including a slide rail that realizes protection of an end of a rail provided with a cap, prevention of deformation of the rail, and restraint of the number of components.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment of a vehicle seat of the present invention with reference to FIGS. 1 to 14. Note that the present embodiment deals with a front-side car seat among vehicle seats. Respective directions illustrated appropriately by arrows in each view correspond to a front side, a rear side, a top side, a bottom side, a right side, and a left side, when viewed from a sitting person sitting on a car seat employed in a vehicle and disposed toward a vehicle front side. Note that each view mainly illustrates an internal structure of a seat body so as to clearly describe a configuration of the embodiment. In view of this, in terms of a seatback 2 and a seat cushion 3, internal frame structures such as a back frame 2f and a cushion frame 3f forming a framework are mainly illustrated, and illustration and description on accessories such as an outer material and a seat pad put on an outer part of the seatback 2 and the seat cushion 3 may be omitted.

Figure 1:
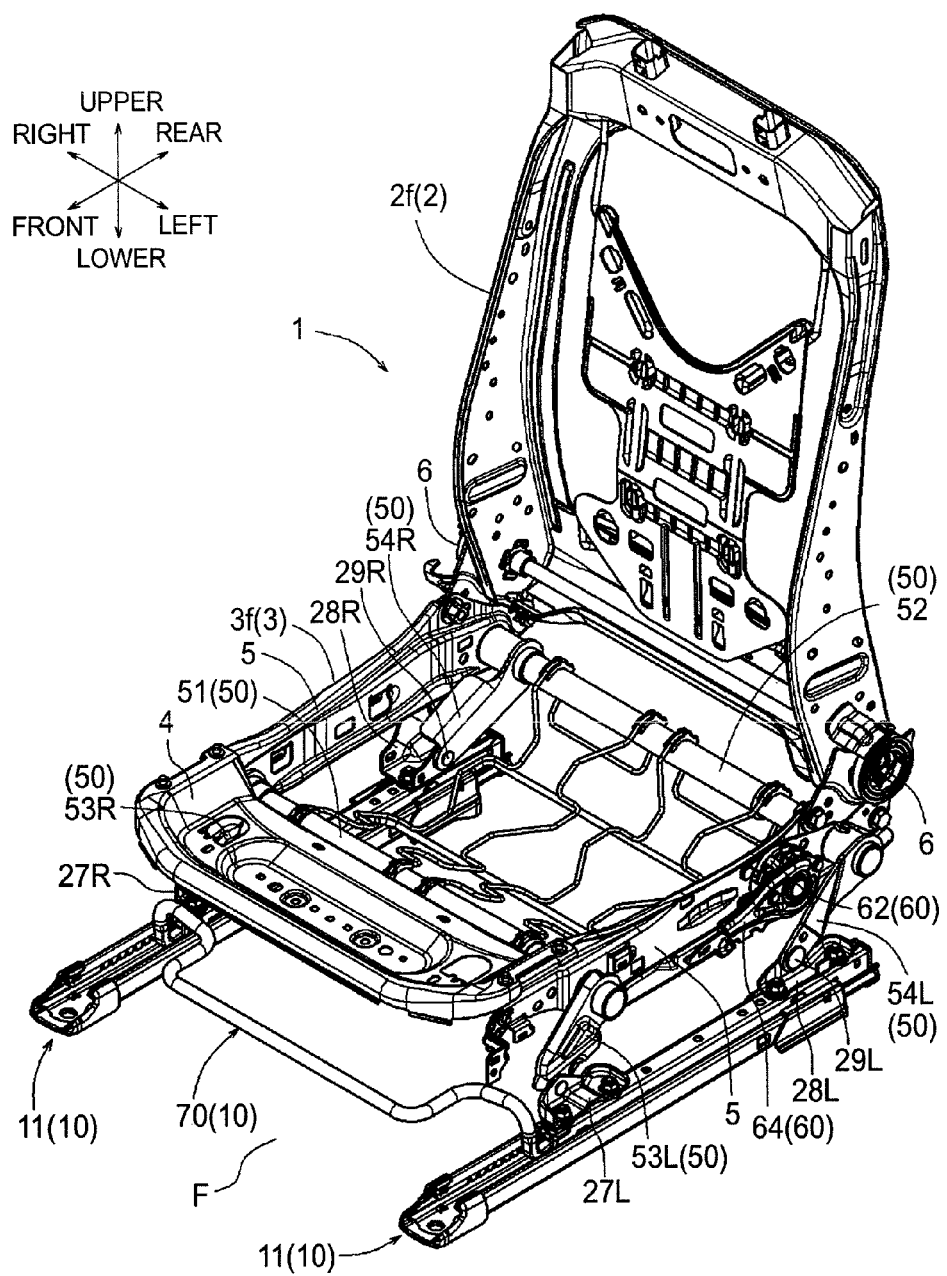
FIG. 1 is an entire perspective view illustrating a car seat according to an embodiment of the present invention.

The car seat (a vehicle seat) includes a seat body 1 mainly including the seatback 2 serving as a backrest portion, and the seat cushion 3 serving as a seat portion, as illustrated in FIG. 1. The seatback 2 includes the back frame 2f forming a framework. The back frame 2f is formed in a generally rectangular frame shape by appropriately performing bending, drawing, or the like on a pipe member or a board member made of a ferrous material. The seat cushion 3 includes the cushion frame 3f forming a framework. The cushion frame 3f is formed in a generally rectangular frame shape by appropriately performing bending, drawing, or the like on a pipe member or a board member made of a ferrous material. The seat body 1 is connected to the cushion frame 3f by a reclining device 6 provided in a lower part of the back frame 2f in a width direction thereof. This allows the seatback 2 to adjust a backrest angle with respect to the seat cushion 3 and to tilt forward toward the seat cushion 3.

As illustrated in FIG. 1, the cushion frame 3f mainly includes a front frame 4, lower arms 5, 5, a front rod 51, and a rear rod 52, and is formed in a generally rectangular frame shape. The lower arms 5, 5 are formed by appropriately bending a board member having a long band-like shape. The lower arms 5, 5 are disposed on respective sides of the cushion frame 3f in its width direction on an upper side of the after-mentioned slide rail device 10, so that a longitudinal direction of the lower arms 5, 5 is along a vehicle front-rear direction. The front frame 4 is disposed on front ends of the lower arms 5, 5 so as to bridge the lower arms 5, 5, and constitutes a front end of the cushion frame 3f. The front rod 51 constituted by a pipe member made of a ferrous material is disposed on a front side of the lower arms 5, 5 so as to penetrate therethrough in the width direction to bridge the lower arms 5, 5. Similarly, the rear rod 52 constituted by a pipe member made of a ferrous material is disposed on a rear side of the lower arms 5, 5 so as to penetrate therethrough in the width direction to bridge the lower arms 5, 5. Note that the front rod 51 and the rear rod 52 are rotatable relative to the lower arms 5, 5.

Figure 2:
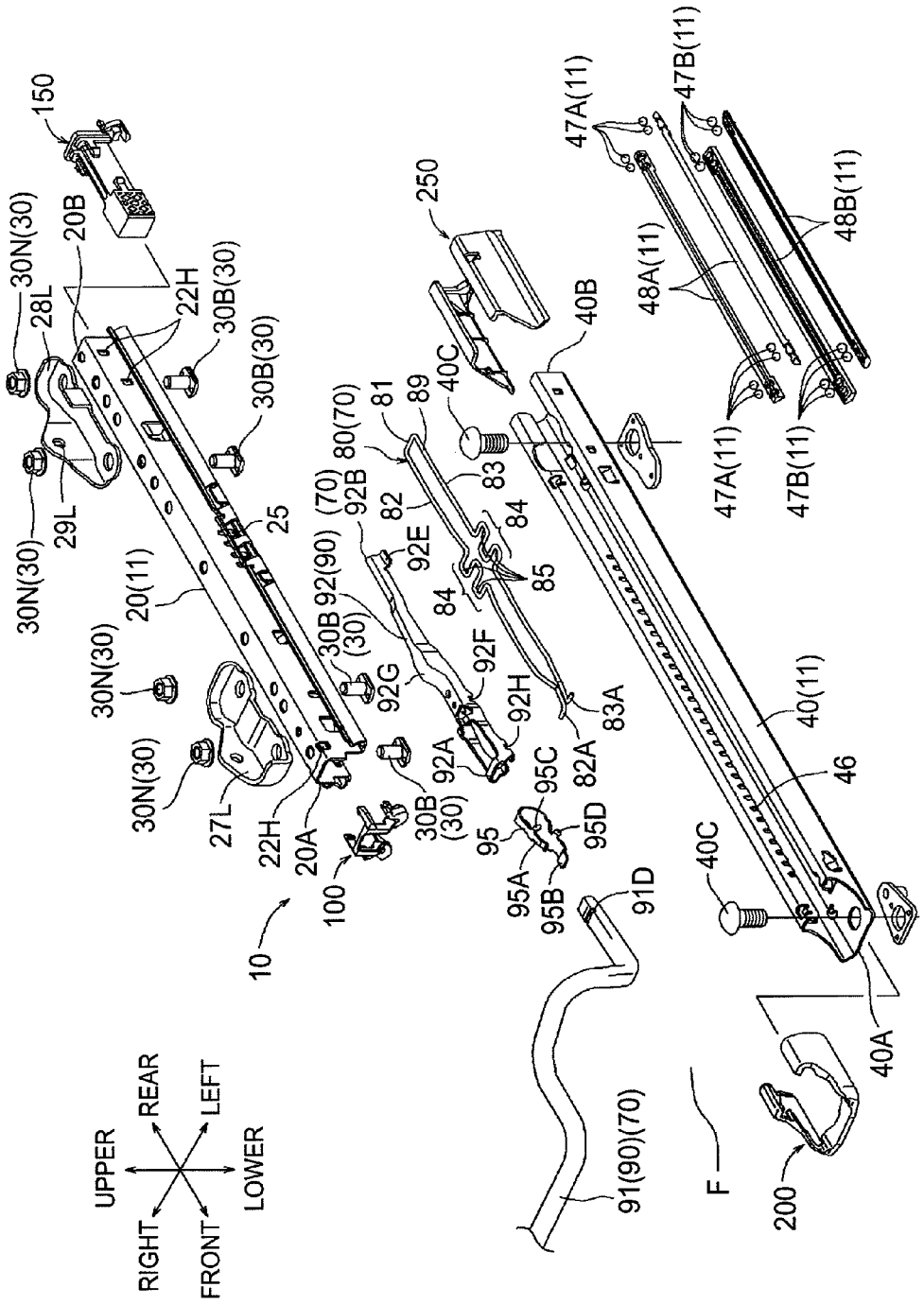
FIG. 2 is an exploded perspective view illustrating a slide rail device of the car seat according to the embodiment of the present invention.

As illustrated in FIGS. 1, 2, the car seat includes a slide rail device 10 provided between the seat body 1 and a floor surface F (a vehicle component) of the vehicle and configured to adjust a sitting position of the seat body 1 relative to the floor surface F in the vehicle front-rear direction. The slide rail device 10 includes slide rails 11, 11 and a slide lock mechanism 70, as illustrated in FIG. 1. A pair of right and left slide rails 11, 11 is disposed in parallel to back other between the seat cushion 3 and the floor surface F along the vehicle front-rear direction.

As illustrated in FIG. 1, the slide rail 11 is disposed between the seat body 1 and the floor surface F of the vehicle, and serves as a mechanism to move the sitting position of the seat body 1 relative to the floor surface F in the vehicle front-rear direction. As illustrated in FIG. 2, the slide rail 11 is mainly constituted by a lower rail 40, an upper rail 20, rolling elements 47A, 47B, and guides 48A, 48B. The lower rail 40 is formed in a shape extending in the vehicle front-rear direction, and is disposed on the floor surface F. The upper rail 20 is disposed on a seat-body-1 side (see FIG. 1), and is fitted to the lower rail 40 so as to be movable in a sliding manner in a rail longitudinal direction thereof. More specifically, the lower rail 40 and the upper rail 20 are provided on top of one another via the rolling elements 47A, 47B and the guides 48A, 48B, so as to be formed in a tubular shape. Hereby, when the upper rail 20 is guided so as to be movable relative to the lower rail 40 in a sliding manner in the vehicle front-rear direction, the upper rail 20 moves the sitting position of the seat body 1 in the vehicle front-rear direction.

Figure 3:
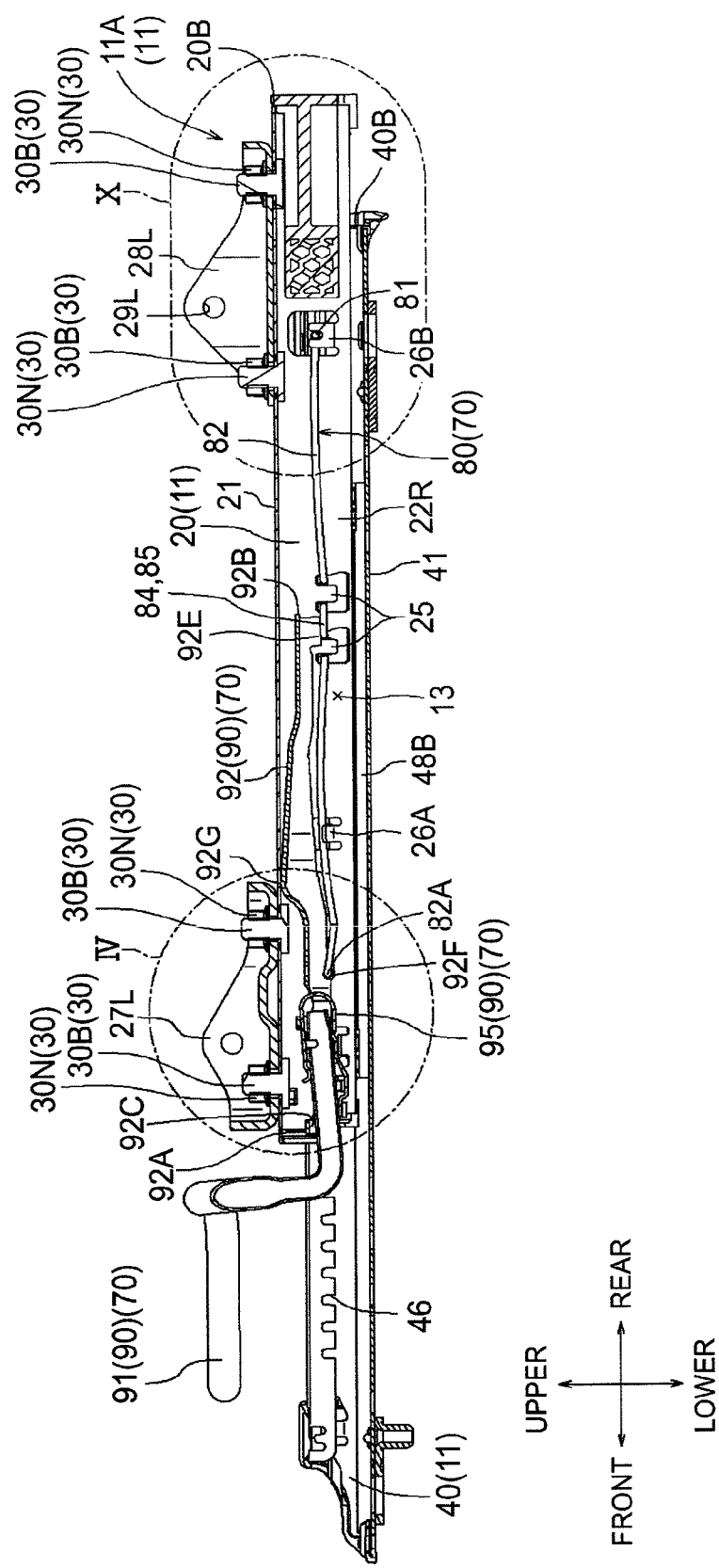
FIG. 3 is a sectional view of the slide rail device of the car seat according to the embodiment of the present invention, taken along a longitudinal direction thereof.
Figure 5:
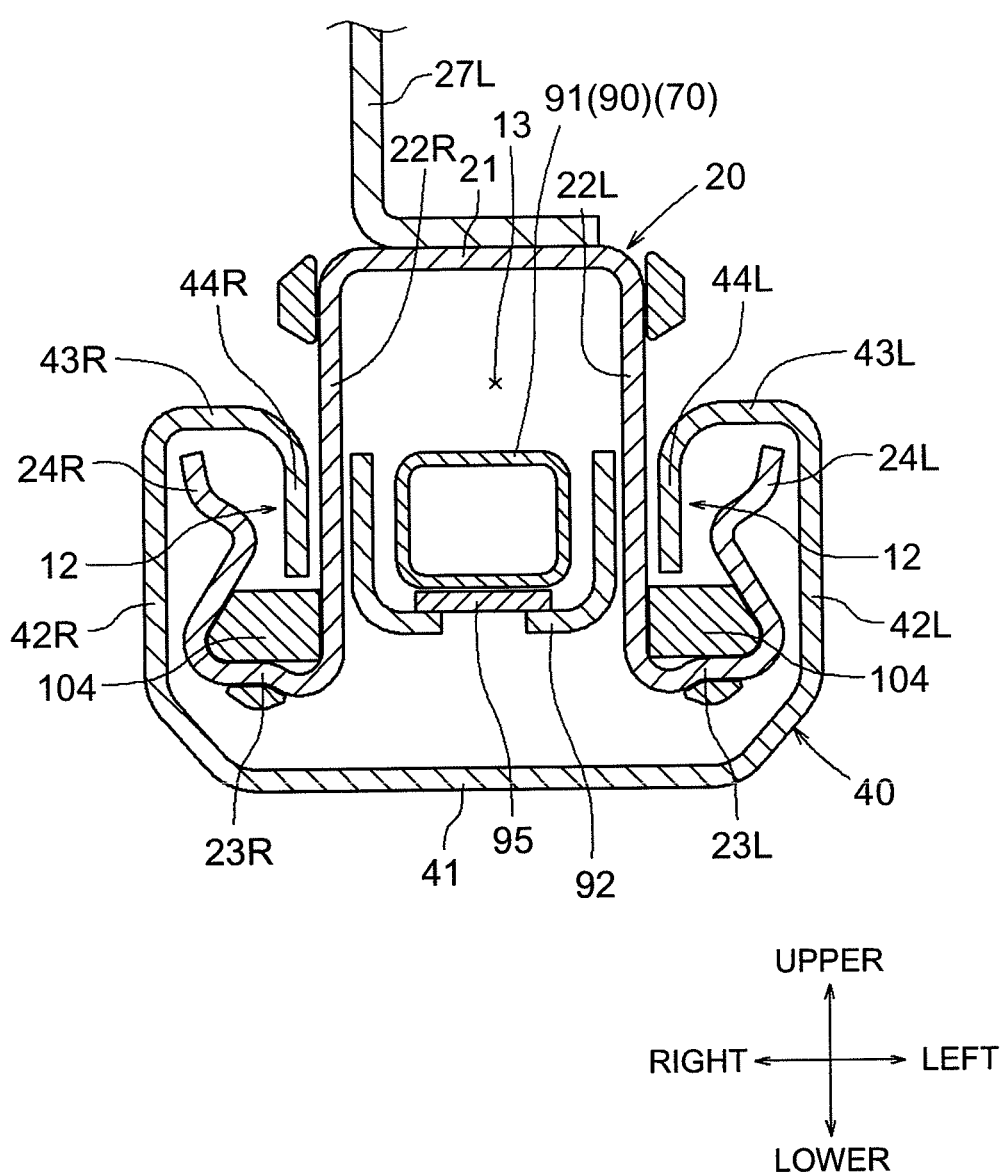
FIG. 5 is a sectional view taken along a line V-V in FIG. 4.
Figure 6:
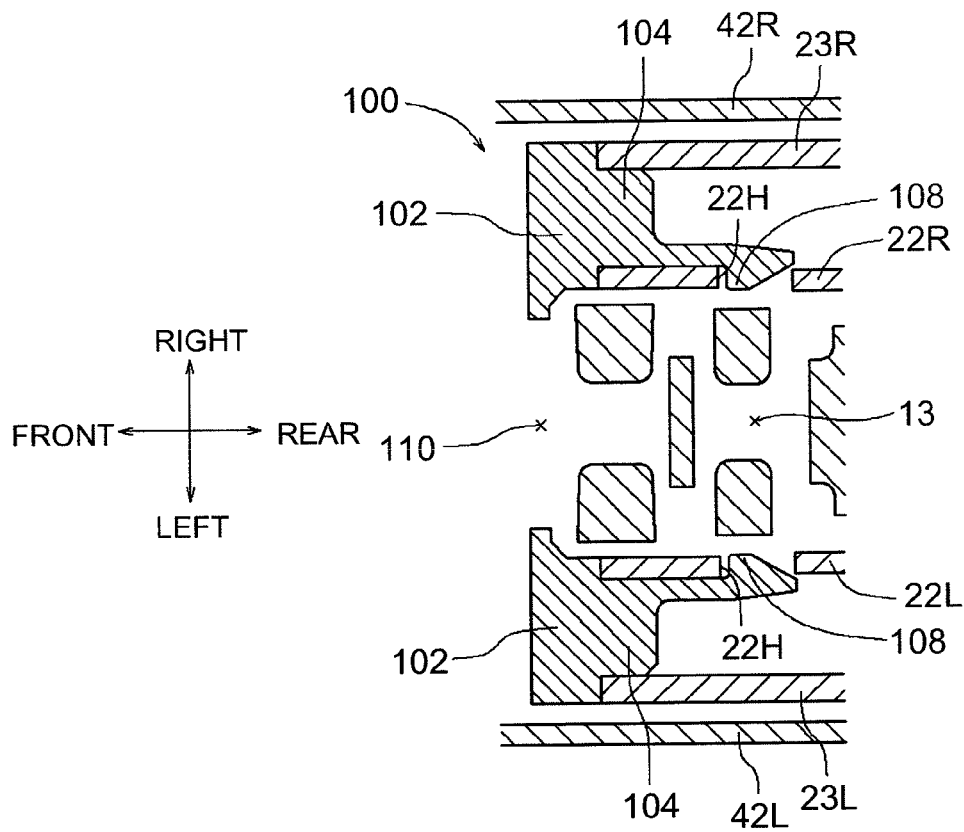
FIG. 6 is a sectional view at a position of a line VI-VI in FIG. 4.
Figure 7:
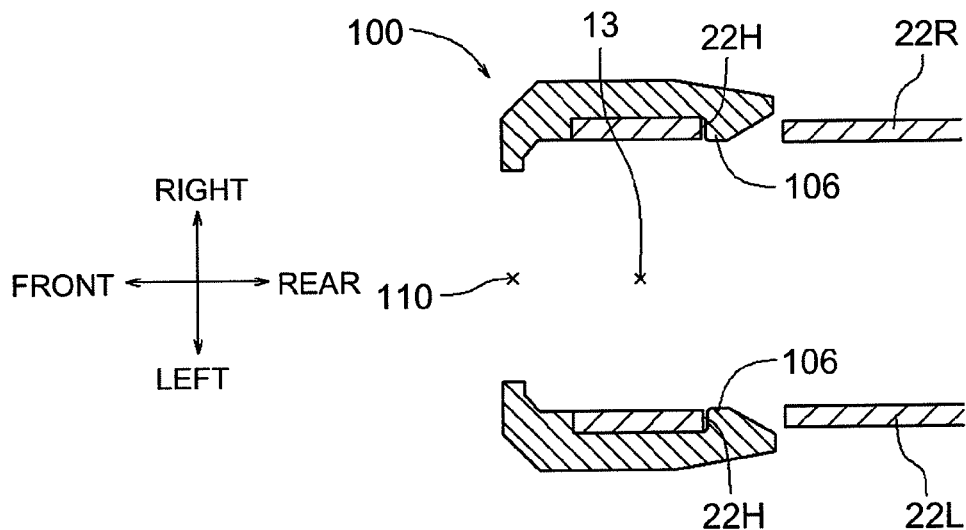
FIG. 7 is a sectional view at a position of a line VII-VII in FIG. 4.
Figure 8:
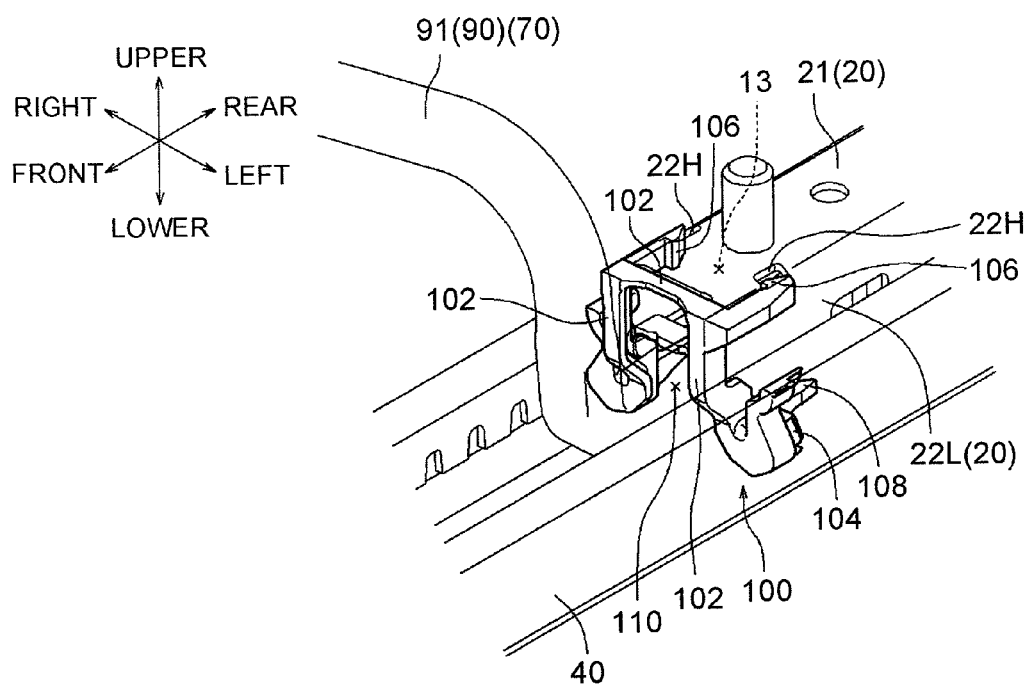
FIG. 8 is a partial perspective view of the part IV in FIG. 3.
Figure 9:
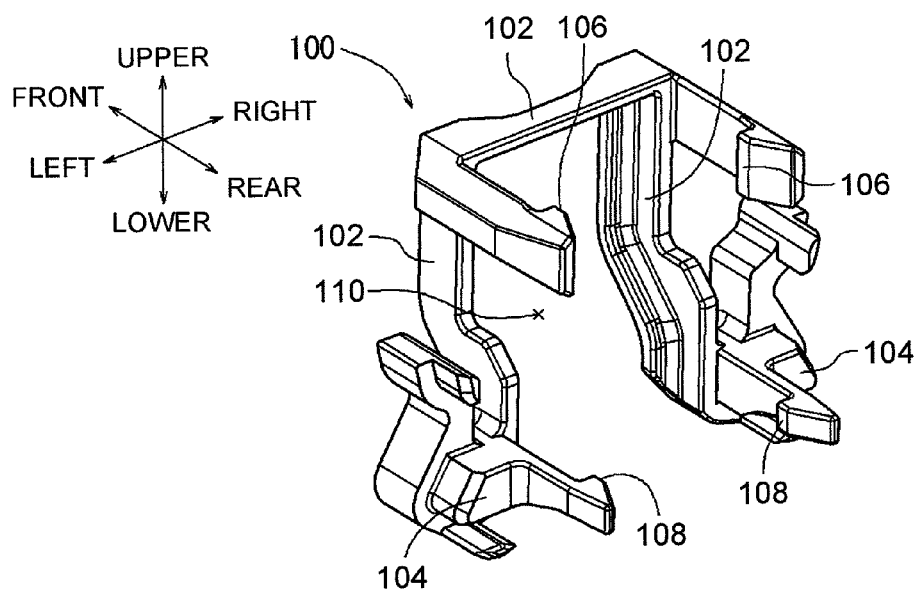
FIG. 9 is an entire perspective view of a cap attached to a front end of the slide rail device in the car seat.

The lower rail 40 is formed in a shape extending in the vehicle front-rear direction, as illustrated in FIG. 2, and is disposed on the floor surface F. As illustrated in FIG. 5, the lower rail 40 is formed integrally to have the following cross section shape by bending, in several places, a single flat-plate member made of a ferrous material. More specifically, the lower rail 40 includes a lower face portion 41 having a flat-plate shape and facing the floor surface F (FIG. 2) generally in a parallel manner. The lower face portion 41 includes a flat-plate right side face portion 42R and a flat-plate left side face portion 42L respectively rising from both ends of the lower face portion 41. The right side face portion 42R and the left side face portion 42L respectively include a flat-plate upper right face portion 43R and a flat-plate upper left face portion 43L obtained by inwardly folding respective upper ends of the right side face portion 42R and the left side face portion 42L. The upper right face portion 43R and the upper left face portion 43L include a flat-plate right tip end portion 44R and a flat-plate left tip end portion 44L hanging down in a straight manner from respective inner ends of the upper right face portion 43R and the upper left face portion 43L. As illustrated in FIGS. 2, 3, the right tip end portion 42R and the left tip end portion 44L are provided with a plurality of locking grooves 46 disposed adjacently along a slide direction, extending in an up-down direction, and being opened on end sides thereof.

As illustrated in FIG. 2, the upper rail 20 is disposed on the seat-body-1 side (see FIG. 1), and is fitted to the lower rail 40 so as to be movable in a sliding manner in the rail longitudinal direction thereof. As illustrated in FIG. 5, the upper rail 20 is formed integrally to have the following cross section shape by bending, in several places, a single flat-plate member made of a ferrous material. More specifically, the upper rail 20 includes an upper face portion 21 having a flat-plate shape and facing the floor surface F generally in a parallel manner. The upper face portion 21 includes a flat-plate right side face portion 22R and a flat-plate left side face portion 22L hanging down in a straight manner from respective ends of the upper face portion 21. The right side face portion 22R and the left side face portion 22L respectively include right folded face portion 23R and a left folded face portion 23L obtained by folding outwardly lower ends of the right side face portion 22R and the left side face portion 22L in a curved manner. The right folded face portion 23R and the left folded face portion 23L respectively include a right tip end portion 24R and a left tip end portion 24L rising in a bending manner from respective outer ends of the right folded face portion 23R and the left folded face portion 23L. As illustrated in FIGS. 2, 3, the right tip end portion 24R and the left tip end portion 24L of the upper rail 20 have respective notch portions 25 formed by partially cutting the right tip end portion 24R and the left tip end portion 24L so as to correspond to the locking grooves 46 of the lower rail 40 in the slide direction. The right side face portion 22R and the left side face portion 22L correspond to "a pair of side face portions" in the present invention.

Hereby, as illustrated in FIG. 5, the lower rail 40 and the upper rail 20 are configured such that, in a sectional view perpendicular to the longitudinal direction thereof, the upper rail 20 is inserted into the lower rail 40 so that the right tip end portion 44R of the lower rail 40 overlaps with the right tip end portion 24R of the upper rail 20, and the left tip end portion 44L of the lower rail 40 overlaps with the left tip end portion 24L of the upper rail 20 in a direction perpendicular to the longitudinal direction thereof. The overlapping tip end portions and the space defined between each of the overlapping tip end portions constitute a fitting portion 12 for preventing separation between the lower rail 40 and the upper rail 20.

The slide lock mechanism 70 is a mechanism capable of regulating a slide movement of the slide rail 11 in an appropriate position in the vehicle front-rear direction, as illustrated in FIG. 2. The slide lock mechanism 70 is mainly constituted by a lock spring 80 (a locking member, and a first biasing member), and an operating member 90.

As illustrated in FIG. 2, the lock spring 80 (the locking member, the first biasing member) is a member having a function as the locking member to cause a slide lock state by engaging the locking groove 46 with the notch portion 25 to regulate a slide movement of the upper rail 20 relative to the lower rail 40 in an appropriate position, and a function as the first biasing member to maintain such a slide lock state by elastic bias. The lock spring 80 is constituted by a metal linear member 89 having a uniform section. As illustrated in FIGS. 2, 3, the lock spring 80 is constituted by a generally U-shaped elongated member configured such that a first linear portion 81 disposed in a direction intersecting with the slide rail 11 is integrally connected to a second linear portion 82 and a third linear portion 83 extending from respective ends of the first linear portion 81 toward one side in the slide direction of the slide rail 11. The second linear portion 82 and the third linear portion 83 are each provided with an elastically deformable portion 84 that is elastically deformable in an up-down direction and disposed at an intermediate position in a longitudinal direction thereof. The elastically deformable portion 84 is provided with engagement portions 85 that are each engageable and disengageable with the locking groove 46 and the notch portion 25. The engagement portions 85 are formed such that the second linear portion 82 and the third linear portion 83 are bent repeatedly in a width direction (generally parallel to the first linear portion 81)

intersecting with the slide direction of the slide rail 11, and thus, the engagement portions 85 are formed in a lattice shape in which the locking groove 46 and the notch portion 25 are receivable. The lock spring 80 includes a spring latching portion 82A formed in an end of the second linear portion 82, and a spring latching portion 83A formed in an end of the third linear portion 83.

The lock spring 80 is provided inside the slide rail 11 in a biasing state as illustrated in FIG. 3. More specifically, the upper rail 20 includes front support portions 26A and rear support portions 26B formed by partially cutting and raising the right side face portion 22R and the left side face portion 22L. The spring latching portion 82A and the spring latching portion 83A of the lock spring 80 are locked from above by a locking portion 92F of the after-mentioned lever member 92. Further, those parts of the second linear portion 82 and third linear portion 83 which are respectively placed between the elastically deformable portion 84 and the spring latching portion 82A and between the elastically deformable portion 84 and the spring latching portion 83A in the lock spring 80 are supported by the front support portions 26A from below. Further, the first linear portion 81 of the lock spring 80 is supported by the rear support portions 26B from below.

Figure 4:
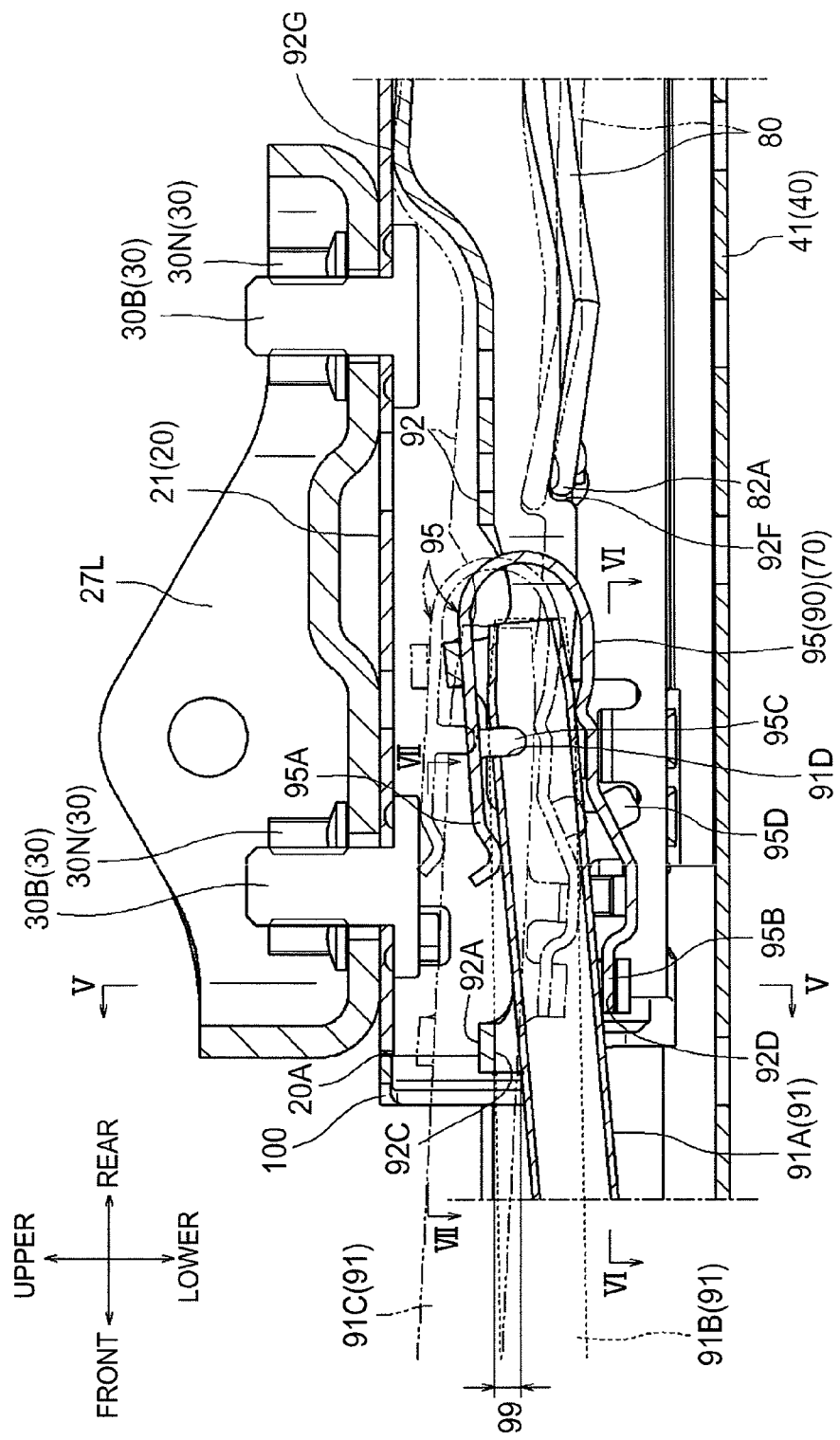
FIG. 4 is a partial sectional view of a part IV in FIG. 3.

As illustrated in FIGS. 2, 3, the operating member 90 is a member configured to transmit a release control force of an operator to the lock spring 80, in order to release the slide lock state where the lock spring 80 serving as the locking member is engaged with the locking grooves 46 and the notch portions 25. The operating member 90 is mainly constituted by a loop handle 91 (an operation input member), a lever member 92 (an operation output member), and a leaf spring 95 (a second biasing member). The lever member 92 is a member configured to operate the engagement portions 85 to be engaged and disengaged with the locking grooves 46 and the notch portions 25 by pressing the elastically deformable portions 84 of the lock spring 80 provided inside the slide rail 11 so as to elastically deform the elastically deformable portions 84 in the up-down direction. The lever member 92 is configured as an elongated member by bending a metal plate-like member. As illustrated in FIGS. 3, 5, the lever member 92 is provided inside a space 13 formed between the upper face portion 21 of the upper rail 20 and the lower face portion 41 of the lower rail 40 and also between the right side face portion 22R and the left side face portion 22L of the upper rail 20 (see FIG. 5). The after-mentioned loop handle 91 is inserted into a front-end-92A side of the lever member 92, as illustrated in FIGS. 3, 4. A pressing portion 92E configured to press the elastically deformable portions 84 of the lock spring 80 is provided on all rear-end-92B side of the lever member 92, as illustrated in FIG. 3. A top surface of the lever member 92 in an intermediate position in a longitudinal direction thereof partially projects so as to constitute a supporting point 92G that abuts with the upper face portion 21 of the upper rail 20. Further, the locking portion 92F configured to lock the spring latching portion 82A and the spring latching portion 83A (see FIG. 2) of the lock spring 80 is provided between the front end 92A and the supporting point 92G of the lever member 92. The loop handle 91 is inserted into those lever members 92 placed in the upper rails 20 of the right and left slide rails 11 which are each formed by appropriately bending a metallic bar-shaped member. As illustrated in FIGS. 2 to 4, the leaf spring 95 is a metallic plate-like member having a generally U-shaped section. The leaf spring 95 is disposed on a front-end-92A side of the lever member 92. An end of the loop handle 91 is inserted into an open-end side of the leaf spring 95. One end 95A of the leaf spring 95 is provided with a projection 95C. The projection 95C is engaged with an upper opening 91D of the loop handle 91 and holds the loop handle 91 so that the loop handle 91 does not fall out. Further, the one end 95A of the leaf spring 95 abuts with the loop handle 91 so as to bias the loop handle 91 downward. The other end 95B of the leaf spring 95 is provided with a projection 95D. The projection 95D is engaged with a slit 92H, which is part of the lever member 92, and holds the lever member 92 so that the leaf spring 95 does not fall out from the lever member 92. Note that, when a biasing force of the lock spring 80 is compared with that of the leaf spring 95, the biasing force of the lock spring 80 is set larger than that of the leaf spring 95. The front end 92A of the lever member 92 is provided with: a stopper 92C with which an upper part of an outer peripheral surface of the loop handle 91 abuts; and a stopper 92D with which a lower part of the outer peripheral surface of the loop handle 91 abuts via the other end 95B of the leaf spring 95. Hereby, the loop handle 91 is attached to the lever member 92 with the leaf spring 95 being placed therebetween, so that the loop handle 91 is rotatable relative to the lever member 92 in a vehicle up-down direction between an initial position 91A in which the loop handle 91 abuts with the stopper 92D due to the biasing force of the leaf spring 95, and a first operation position 91B in which the loop handle 91 abuts with the stopper 92C due to an operation force of the operator against the biasing force of the leaf spring 95. The loop handle 91 is biased by the leaf spring 95 so as to be generally placed in the initial position 91A as illustrated in FIG. 4. A play 99 (clearance) that allows the lever member 92 to pivot is provided between the upper part of the outer peripheral surface of the loop handle 91 and the stopper 92C of the lever member 92 in the initial position 91A. When an operation force is applied to the loop handle 91 in a direction where the loop handle 91 is lifted upward, the loop handle 91 rotates in a clockwise direction in FIG. 4 until the loop handle 91 abuts with the stopper 92C against the biasing force of the leaf spring 95 (the loop handle 91 pivots within the play 99). When the loop handle 91 is further operated from the first operation position 91B in which the loop handle 91 abuts with the stopper 92C of the lever member 92, the front-end-92A side is lifted. At this time, while the loop handle 91 abuts with the stopper 92C, the biasing force of the leaf spring 95 is not further applied thereto. In such a state, the lever member 92 rotates in the clockwise direction in FIG. 4 around the supporting point 92G, so as to reach a second operation position 91C in which the pressing portion 92E (see FIG. 3) moves downward against the biasing force of the lock spring 80. The pressing portion 92E (see FIG. 3) of the lever member 92 placed in the second operation position 91C presses the elastically deformable portion 84 of the lock spring 80 so as to elastically deform the elastically deformable portion 84, thereby disengaging the engagement portions 85 from the locking grooves 46 and the notch portions 25.

As illustrated in FIGS. 1, 2, a link mechanism 50 is provided between the cushion frame 3f of the seat body 1 and the slide rail device 10 in the car seat. The link mechanism 50 is constituted by the front rod 51, the rear rod 52, front links 53R, 53L, and rear links 54R, 54L. The front links 53R, 53L each constituted by a board member made of a ferrous material are integrally fixed to both ends of the front rod 51. Similarly, the rear links 54R, 54L each constituted by a board member made of a ferrous material are integrally fixed to both ends of the rear rod 52. The front links 53R, 53L at both ends of the front rod 51 are rotatably attached thereto via brackets 27R, 27L, respectively. The bracket 27R, 27L is attached to the upper face portion 21 of the upper rail 20 by a fastening member 30 constituted by bolts 30B and nuts 30N so as to sandwich a pivot shaft of the front link 53R, 53L in the front-rear direction. Similarly, the rear links 54R, 54L at both ends of the rear rod 52 are rotatably attached to link pivot shafts 29R, 29L via brackets 28R, 28L, respectively. The bracket 28R, 28L is attached to the upper face portion 21 of the upper rail 20 by a fastening member 30 constituted by bolts 30B and nuts 30N so as to sandwich a link pivot shaft 29R, 29L of the rear link 54R, 54L in the front-rear direction. Pivoting of each link in the link mechanism 50 is performed by an operation of a lift mechanism 60.

In a case where the lift mechanism 60 is provided on a front seat on the left side, as illustrated in FIG. 1, for example, the lift mechanism 60 is disposed on an outer side of the seat cushion 3 (the left side in FIG. 1 in a state where a sitting person sits thereon). The lift mechanism 60 is mainly constituted by a pinion gear (not shown), an operating pivot member 62, a lifter lever 64, a sector gear (not shown). The lift mechanism 60 is configured such that the operating pivot member 62 and the lifter lever 64 are disposed on an outer side of the lower arm 5, and the pinion gear and the sector gear (not shown) are disposed on an inner side of the lower arm 5. The sector gear is integrally fixed to the rear rod 52, and the pinion gear is engaged therewith. The pinion gear is connected to the operating pivot member 62 via a hole portion (not shown) formed in the lower arm 5, and the operating pivot member 62 is connected to the lifter lever 64.

As illustrated in FIG. 1, when a rotation operating force is applied to the lifter lever 64, the pinion gear rotates, so that the rotation operating force is transmitted to the sector gear and the rear rod 52 pivots. Along with the pivot of the rear rod 52 in one direction, the rear link 54R and the rear link 54L pivot around the link pivot shafts 29R, 29L of the brackets 28R, 28L toward a front side in FIG. 1 (i.e., in a counterclockwise direction in FIG. 1). Hereby, the seat body 1 moves to an upward movement position that is a front side and an upper side. When a rotation operating force is applied to the lifter lever 64 and the pinion gear rotates reversely, the rear rod 52 pivots in a reverse direction. Along with the pivot of the rear rod 52 in the other direction, the rear link 54R and the rear link 54L pivot around the link pivot shafts 29R, 29L of the brackets 28R, 28L toward a rear side in FIG. 1 (i.e., in a clockwise direction in FIG. 1). Hereby, the seat body 1 moves to a downward movement position that is a rear side and a downward side. The front rod 51 and the front links 53R, 53L pivot in the same direction along with the movement of the seat body 1. Note that, when the rotation operating force is not applied to the lifter lever 64, a braking force of the operating pivot member 62 works in the lift mechanism 60, so that a rotation of the pinion gear is restricted. Accordingly, the pivot of the rear rod 52 is restricted, so as to retain a position of the seat body 1 in the up-down direction.

The upper rail 20 and the lower rail 40 in the slide rail 11 are provided with caps 100, 150 and caps 200, 250, respectively, so as to protect respective ends thereof, as illustrated in FIG. 2. The caps 100, 150, 200, 250 are made of synthetic resin, and are fitted into their corresponding rail ends. Further, the caps 100, 150 provided in the upper rail 20 are configured to prevent deformation of the ends of the upper rail 20.

The cap 100 is provided in a vehicle-front-side end out of longitudinal ends of the upper rail 20, as illustrated in FIGS. 6 to 9. The cap 100 includes a base portion 102 adjacent to the upper rail 20 generally along a shape of an end surface of the upper rail 20. In a sectional view of the cap 100 viewed in a direction perpendicular to the longitudinal direction of the lower rail 40 and the upper rail 20, space filling portions 104 configured to fill spaces in the fitting portion 12 in a separation direction where the lower rail 40 and the upper rail 20 are separated from each other are formed in the cap 100 so as to extend from the base portion 102 toward a longitudinal center of the upper rail 20. In the spaces in the fitting portion 12 in the separation direction where the lower rail 40 and the upper rail 20 are separated from each other, the space filling portions 104 are provided in spaces opposed to the right tip end portion 44R and the left tip end portion 44L. More specifically, the space filling portions 104 are each formed in a shape that fills a space between the right tip end portion 44R of the lower rail 40 and the right folded face portion 23R of the upper rail 20, or a space between the left tip end portion 44L of the lower rail 40 and the left folded face portion 23L of the upper rail 20. The cap 100 includes claw portions locked to hole portions 22H provided in the right side face portion 22R and the left side face portion 22L (see FIG. 8) of the upper rail 20 so as to be attached thereto. The claw portions include a pair of first claw portions 106 provided on an upper side; and a pair of second claw portions 108 provided on a lower side. The pair of first claw portions 106 and the pair of second claw portions 108 extend from the base portion 102 toward the longitudinal center of the upper rail 20. The first claw portions 106 and the second claw portions 108 of the cap 100 are configured to be locked, from outside, to the hole portions 22H of the right side face portion 22R and the left side face portion 22L (see FIG. 8) of the upper rail 20. The base portion 102 of the cap 100 is provided with an opened portion 110 that allows the operating member 90 to be inserted therefrom into the space 13 of the slide rail 11. The hole portions 22H to which the first claw portions 106 and the second claw portions 108 are locked may be formed in the upper face portion 21 of the upper rail 20.

As such, the cap 100 includes the base portion 102 adjacent to the upper rail 20 generally along a shape of an end surface of a longitudinal end of the upper rail 20 in which the cap 100 is provided. This allows the base portion 102 of the cap 100 to protect the end of the upper rail 20. Further, the cap 100 includes the space filling portions 104 formed so as to extend from the base portion 102 toward the longitudinal center of the upper rail 20 in which the cap 100 is provided, so as to fill the spaces in the fitting portion 12 in the separation direction where the lower rail 40 and the upper rail 20 are separated from each other. Accordingly, when a large load caused due to a vehicle collision or the like is applied in the direction where the lower rail 40 and the upper rail 20 are separated from each other, the space filling portions 104 of the cap 100 restrain backlash between these members (relative movement therebetween in the up-down direction), thereby making it possible to improve rigidity of the rails. Due to the improvement of the rigidity of the rails, it is possible to prevent deformation of the ends of the lower rail 40 and the upper rail 20. In this way, it is possible to protect the rail end of the upper rail 20 and also to prevent deformation of the ends of the lower rail 40 and the upper rail 20.

Further, in the spaces in the fitting portion 12 in the separation direction where the lower rail 40 and the upper rail 20 are separated from each other, the space filling portions 104 are provided in the spaces opposed to the right rip end portion 44R and the left tip end portion 44L (a pair of inner tip end portions). This is because, when a large load caused due to a vehicle collision or the like is applied in the direction where the lower rail 40 and the upper rail 20 are separated from each other, backlash between these members occurs markedly in the right tip end portion 44R and in the left tip end portion 44L. In view of this, by providing the space filling portions 104 in such portions, it is possible to further prevent deformation of the ends of the lower rail 40 and the upper rail 20 and to improve the rigidity thereof.

Further, the cap 100 is attached to the upper rail 20 by locking with the first claw portions 106 and the second claw portions 108. The attachment of the cap 100 does not need to perform fixation by use of a fastening member or the like. This may allow the cap 100 to achieve reduction of the number of component parts and improvement of attachment workability.

Further, the first claw portions 106 and the second claw portions 108 used for the attachment of the cap 100 are configured to be locked, from outside, to the hole portions 22H formed at least one of the side surface potions of the upper rail 20. This makes it possible to restrain interference of slide movements of the lower rail 40 and the upper rail 20.

Further, the lock spring 80 (the locking member) is disposed in the space 13 formed between the lower face portion 41 of the lower rail 40 and the upper face portion 21 of the upper rail 20, and the operating member 90 is configured to be inserted from longitudinal ends of the lower rail 40 and the upper rail 20 so as to be engaged with the lock spring 80. As such, the slide lock mechanism 70 is disposed within the slide rail 11, so that it is possible to realize effective utilization of a space around the slide rail 11. However, in a case of such a configuration, the operating member 90 is inserted from a longitudinal end of the slide rail 11, which may cause such a concern that the operating member 90 interferes with the cap 100. However, the base portion 102 of the cap 100 is provided with the opened portion 110 configured to allow the insertion of the operating member 90. Since the base portion 102 of the cap 100 includes the opened portion 110, even if the operating member 90 for operating the lock spring 80 disposed within the slide rail 11 is inserted from the longitudinal end of the slide rail 11, it is possible to protect the rail end of the upper rail 20 and also to prevent deformation of the end of the upper rail 20.

The above description deals with a configuration in which the cap 100 is provided in the front end 20A of the upper rail 20, but this configuration is also applicable to the rear end 20B. Further, the above description deals with a configuration in which the space filling portions 104 of the cap 100 are provided in the upper rail 20, but the space filling portions 104 may be provided in the front end 40A or the rear end 40B of the lower rail 40. Further, the above description deals with a configuration in which in the spaces in the separation direction, the space filling portions 104 are provided in the spaces opposed to the right tip end portion 44R and the left tip end portion 44L of the lower rail 40. However, it is possible to provide the space filling portions 104 in various parts in the fitting portion 12 for preventing separation between the lower rail 40 and the upper rail 20, provided that a space in the separation direction of these members can be filled in those parts.

Figure 10:
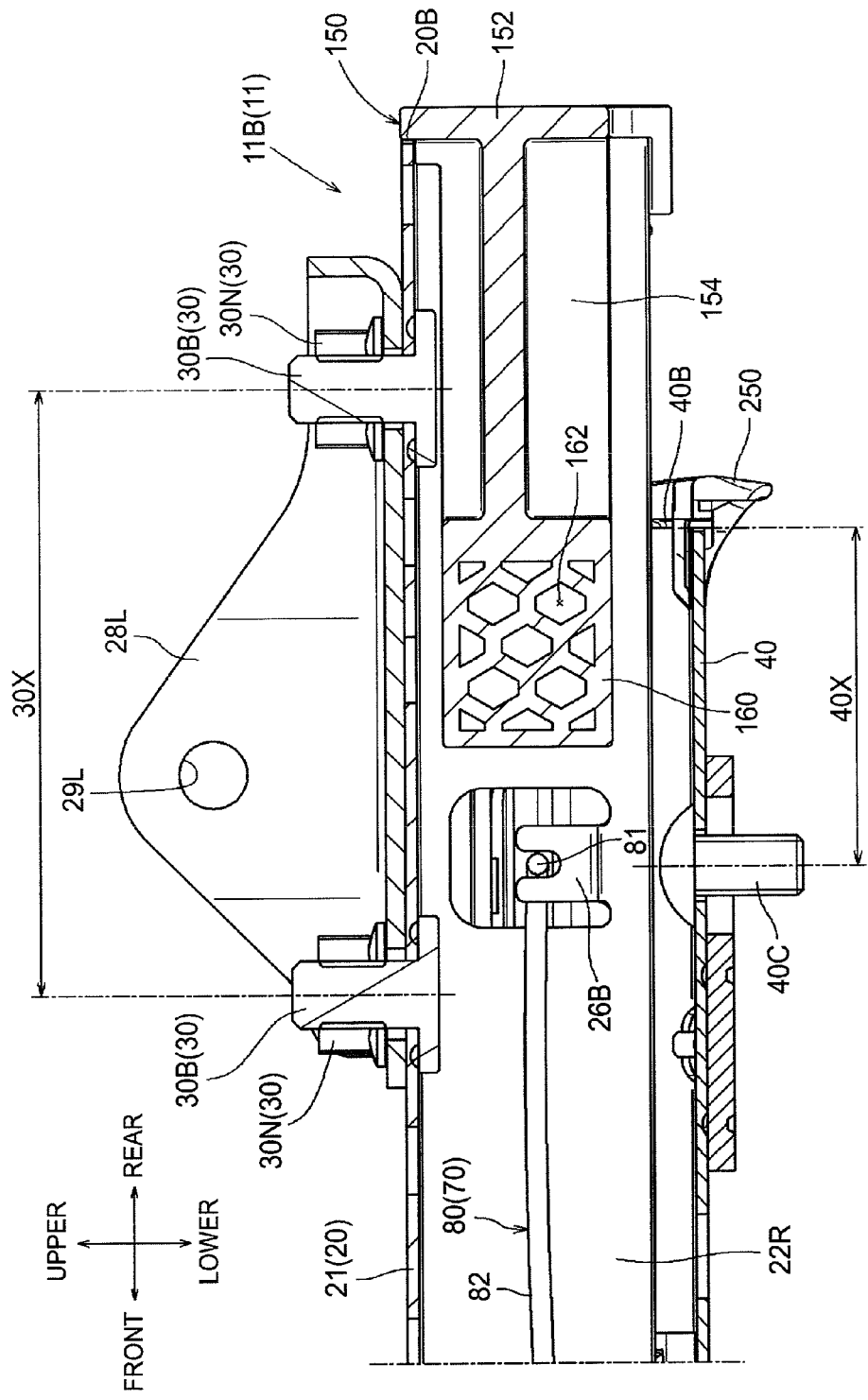
FIG. 10 is a partial sectional view of a part X in FIG. 3.
Figure 11:
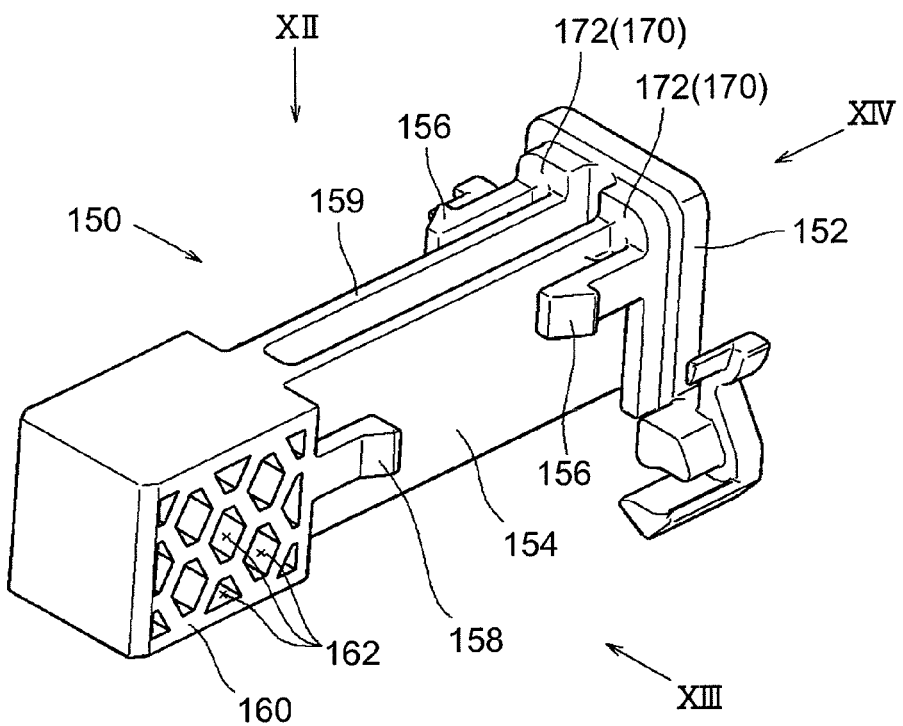
FIG. 11 is an entire perspective view of a cap attached to a rear end of the slide rail device in the car seat according to the embodiment of the present invention.
Figure 12:
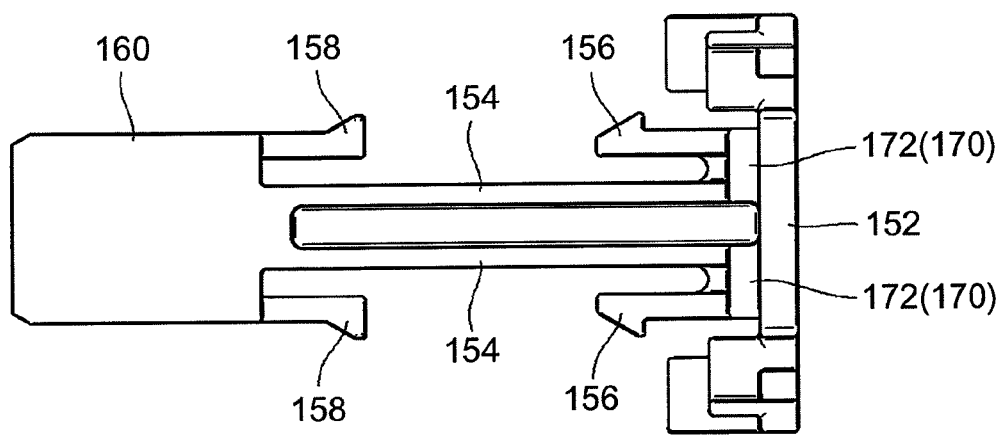
FIG. 12 is a top view of the cap attached to the rear end of the slide rail device in the car seat according to the embodiment of the present invention.
Figure 13:
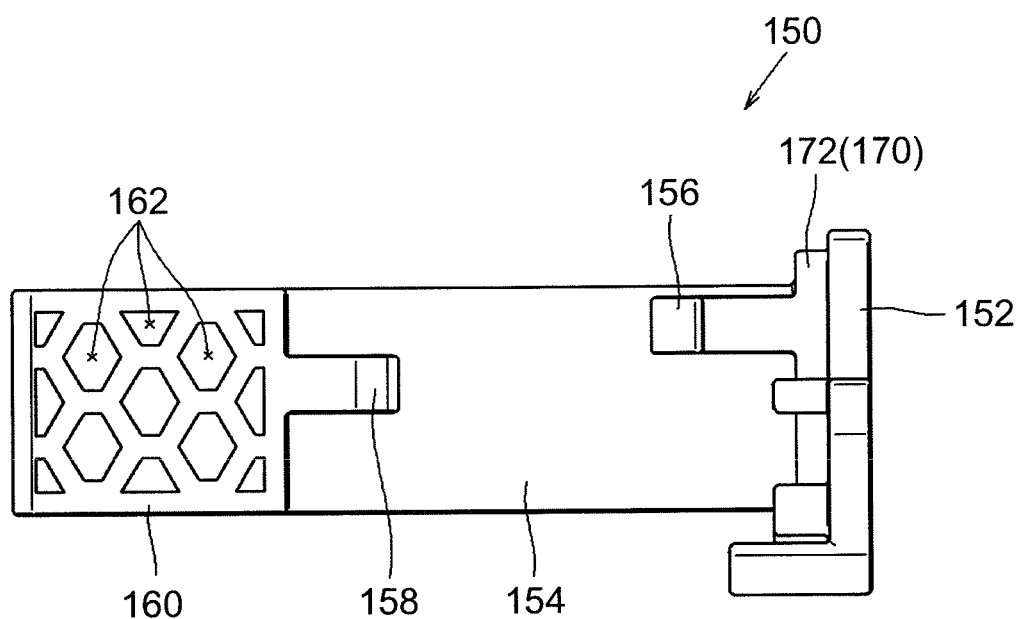
FIG. 13 is a front view of the cap attached to the rear end of the slide rail device in the car seat according to the embodiment of the present invention.
Figure 14:
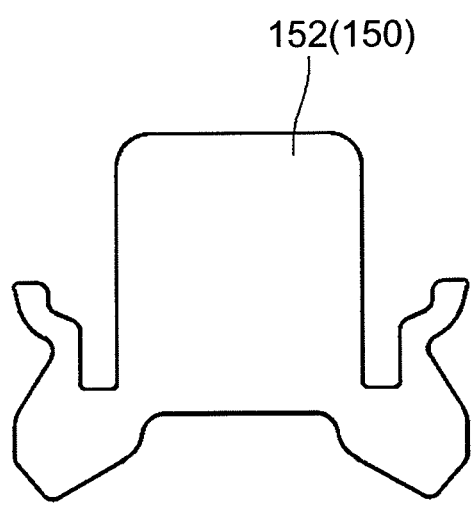
FIG. 14 is a side view of the cap attached to the rear end of the slide rail device in the car seat according to the embodiment of the present invention.

As illustrated in FIGS. 10 to 14, the cap 150 is provided in the rear end 20B of the upper rail 20 so as to protect the rear end 20B of the upper rail 20 and to restrain deformation of the upper rail 20, thereby restraining separation thereof from the lower rail 40. The cap 150 includes a flat-plate base portion 152 adjacent to the longitudinal rear end 20B of the upper rail 20 in which the cap 150 is provided. As illustrated in FIG. 14, in order to protect the rear end 20B of the upper rail 20, the base portion 152 is formed to have a shape similar to the shape of the space 13 (see FIG. 5), and the right tip end portion 24R and the left tip end portion 24L (see FIG. 5). Further, as illustrated in FIG. 10, the cap 150 includes: a first deformation prevention portion 160 provided so as to extend into the space 13 from the base portion 152 toward the longitudinal center of the upper rail 20 and to be placed between the right side face portion 22R and the left side face portion 22L (see FIG. 5) within the space 13, thereby restraining deformation of the rail. The first deformation prevention portion 160 is formed in a substantially rectangular-prism shape (e.g., a cubic shape) so as to face the upper face portion 21, the right side face portion 22R, and the left side face portion 22L within the space 13. Those parts of the first deformation prevention portion 160 which face the right side face portion 22R and the left side face portion 22L have a plurality of penetration portions 162 opened so as to penetrate between the right side face portion 22R and the left side face portion 22L. This allows the first deformation prevention portion 160 to reduce its weight without reducing its rigidity. Further, the cap 150 includes claw portions attached to the upper rail 20 by being locked to hole portions 22H (see FIG. 2) provided in the right side face portion 22R and the left side face portion 22L (see FIG. 5) of the rear end 20B of the upper rail 20. The claw portions are provided between the base portion 152 and the first deformation prevention portion 160 in the cap 150 as illustrated in FIGS. 11, 12, and include: a pair of first claw portions 156 provided on a base-portion-152 side; and a pair of second claw portions 158 provided on a first-deformation-prevention-portion-160 side. Here, as illustrated in FIG. 10, when the upper rail 20 is placed in a rearmost position 11B within a slidable range where the upper rail 20 is movable in a sliding manner relative to the lower rail 40, the slide rail 11 has a positional relationship in which the rear end 20B of the upper rail 20 is placed on a rear side relative to the rear end 40B of the lower rail 40. Therefore, at the time of the positional relationship in which the upper rail 20 is placed in the rearmost position 11B within the slidable range, the first deformation prevention portion 160 is provided in vicinity to the rear end 40B of the lower rail 40. More specifically, at the time of the positional relationship in which the upper rail 20 is placed in the rearmost position 11B within the slidable range, the first deformation prevention portion 160 is disposed so as to longitudinally overlap with at least part of a fixing area 40X between the rear end 40B of the lower rail 40 and a fixing member 40C fixing a rear-end-40B side of the lower rail 40 to a vehicle component such as a floor of the vehicle. Further, the first deformation prevention portion 160 is disposed so as to longitudinally overlap with at least part of an attachment area 30X where the seat body 1 is attached to the upper face portion 21 of the upper rail 20 by a fastening member 30 constituted by bolts 30B and nuts 30N. In view of this, the cap 150 is provided with a connection portion 154 for integrally connecting the base portion 152 to the first deformation prevention portion 160 so as to provide, away from the base portion 152, the first deformation prevention portion 160 in a position corresponding to the areas 40X, 30X. As illustrated in FIGS. 11, 12, the connection portion 154 is formed thinner than the base portion 152 and the first deformation prevention portion 160, so as to achieve reduction in weight and to allow the first claw portions 156 and the second claw portions 158 to be easily deformed elastically. Further, the base portion 152 is provided with a second deformation prevention portion 170 restraining deformation of the lower rail 40 or the longitudinal rear end 20B of the upper rail 20. In a position of the rear end 20B of the upper rail 20, the second deformation prevention portion 170 is provided with wall portions 172 that abut with an inner peripheral surface of the upper face portion 21 and inner peripheral surfaces of the right side face portion 22R and the left side face portion 22L.

As such, according to the vehicle seat of the embodiment, the cap 150 includes the base portion 152 adjacent to the longitudinal rear end 20B of the upper rail 20 in which the cap 150 is provided, thereby making it possible to protect the rail end. Further, the first deformation prevention portion 160 is provided between the right side face portion 22R and the left side face portion 22L within the space 13 surrounded by the lower face portion 41 of the lower rail 40, the upper face portion 21 of the upper rail 20, and the right side face portion 22R and the left side face portion 22L (a pair of side face portions) of the upper rail 20. Here, when a large load is applied to the slide rail 11 due to a vehicle collision or the like so that the seat body 1 falls forward and the lower rail 40 and the upper rail 20 move away from the rear side due to the large load, the right side face portion 22R and the left side face portion 22L are deformed so as to come close to each other. In view of this, the first deformation prevention portion 160 restrains the deformation of the right side face portion 22R and the left side face portion 22L, so as to restrain deformation of the rail. Further, the base portion 152 and the first deformation prevention portion 160 are provided integrally, thereby making it possible to restrain the number of components. Further, when the upper rail 20 is placed in the rearmost position 11B within the slidable range where the upper rail 20 is movable in a sliding manner relative to the lower rail 40, the slide rail 11 has the positional relationship in which the rear end 20B of the upper rail 20 is placed on a rear side relative to the rear end 40B of the lower rail 40. At this time, if the lower rail 40 and the upper rail 20 move away from the rear side due to the vehicle collision or the like, the rear end 40B of the lower rail 40 is deformed markedly. In terms of this, at the time of the positional relationship in which the upper rail 20 is placed in the rearmost position 11B within the slidable range, the first deformation prevention portion 160 is provided in vicinity to the rear end 40B of the lower rail 40. As such, the first deformation prevention portion 160 is disposed in a desirable position in terms of restraining deformation of the rail.

Further, at the time of the positional relationship in which the upper rail 20 is placed in the rearmost position 11B within the slidable range, the first deformation prevention portion 160 is disposed so as to longitudinally overlap with at least part of the fixing area 40X between the rear end 40B of the lower rail 40 and the fixing member 40C fixing the rear-end-40B side of the lower rail 40 to the vehicle component such as the floor of the vehicle. Accordingly, the first deformation prevention portion 160 is disposed in a further desirable position in terms of restraining the deformation of the rail.

Further, the first deformation prevention portion 160 is disposed so as to longitudinally overlap with at least part of the attachment area 30X where the seat body 1 is attached to the upper face portion 21 of the upper rail 20. At the time when a large load is applied to the slide rail 11 due to a vehicle collision or the like so that the seat body 1 falls forward, a transmission path of the load is the attachment area 30X where the seat body 1 is attached to the upper face portion 21 of the upper rail 20. Accordingly, when the first deformation prevention portion 160 is disposed in the attachment area 30X serving as an origin of the deformation, it is further possible to restrain the deformation of the rail.

Further, when the base portion 152 of the cap 150 is provided with the second deformation prevention portion 170 restraining deformation of the lower rail 40 or the longitudinal rear end 20B of the upper rail 20, it is further possible to restrain the deformation of the rail.

The embodiment of the invention has been described above, but the vehicle seat of the present invention is not limited to the above embodiment, and is performable in various embodiments other than the above embodiment. For example, the configurations of the lower rail and the upper rail of the slide rail of the present embodiment are just one example of one embodiment, and various rail configurations are usable provided that a fitting portion for preventing separation between the lower rail and the upper rail can be provided therein. For example, the lower rail and the upper rail may be configured in a reverse manner to the present embodiment. Further, the cap exemplified herein is made of synthetic resin, but the cap is not limited to this, and may be made of metal. Further, the present embodiment deals with the vehicle seat including a lift mechanism, but the present invention is not limited to this. The lift mechanism is not a necessary constituent in the vehicle seat of the present invention. That is, a seat body may be connected to an upper rail via a bracket without a lift mechanism.

What is claimed is:

1. A vehicle seat comprising:
 a slide rail including:
  a lower rail disposed on a vehicle component side;
  an upper rail disposed on a seat body side and supported by the lower rail so as to be movable in a sliding manner relative to the lower rail; and
  a cap provided in a longitudinal rear end of the upper rail, wherein
 the slide rail has a space that receives the cap therein, the space being provided between a lower face portion of the lower rail and an upper face portion of the upper rail, the space being further provided between a pair of side face portions of the upper rail, wherein the lower face portion faces the vehicle component side and the upper face portion faces the seat body side,
 when the upper rail is placed in a rearmost position within a slidable range where the upper rail is movable in the sliding manner relative to the lower rail, the slide rail has a positional relationship in which the longitudinal rear end of the upper rail is placed on a rear side of the lower rail relative to a longitudinal rear end of the lower rail,
 the upper rail is inserted into the lower rail such that, in a transverse sectional view perpendicular to a longitudinal direction of the slide rail, the upper rail and the lower rail overlap outside of the space in the transverse sectional view of the slide rail,
 the cap provided in the upper rail integrally includes a base portion adjacent to the longitudinal rear end of the upper rail provided with the cap, a first deformation prevention portion extending into the space from the base portion toward a longitudinal center of the upper rail provided with the cap, the first deformation prevention portion being substantially rectangular-prism shaped and provided between the pair of side face portions within the space such that the first deformation prevention portion extends into an interior of the lower rail and at least fills, in the transverse sectional view of the slide rail, a part of the space between where the upper rail and the lower rail laterally overlap to restrain deformation of the upper rail, and a pair of claw portions that are directly connected to a longitudinal rear end of the first deformation prevention portion and extend toward the longitudinal rear end of the upper rail, and when the upper rail is placed in the rearmost position within the slidable range, the first deformation prevention portion is placed in vicinity to the longitudinal rear end of the lower rail in the longitudinal direction of the slide rail.

2. The vehicle seat according to claim 1, wherein
when the upper rail is placed in the rearmost position within the slidable range, the first deformation prevention portion is disposed so as to longitudinally overlap with at least part of a fixing area between the longitudinal rear end of the lower rail and a fixing member fixing the rear side of the lower rail to a vehicle component on the vehicle component side.

3. The vehicle seat according to claim 1, wherein
the first deformation prevention portion is disposed so as to longitudinally overlap with at least part of an attachment area where a seat body on the seat body side is attached to the upper face portion of the upper rail.

4. The vehicle seat according to claim 1, wherein
the base portion is provided with a second deformation prevention portion restraining deformation of the longitudinal rear end of the upper rail.

5. The vehicle seat according to claim 1, wherein
the first deformation prevention portion includes a plurality of penetration portions that extend across the first deformation prevention portion in a direction transverse to the longitudinal direction of the slide rail.

6. The vehicle seat according to claim 1, wherein
the cap includes a connection portion that connects the base portion to the first deformation prevention portion such that the base portion and the first deformation prevention portion are spaced from one another in the longitudinal direction of the slide rail, and
the connection portion is thinner than the base portion in the transverse sectional view perpendicular to the longitudinal direction of the slide rail to allow the pair of claw portions to be elastically deformed toward the connection portion.

7. The vehicle seat according to claim 6, wherein
the connection portion is disposed between the pair of claw portions in a direction transverse to the longitudinal direction of the slide rail.

8. A vehicle seat comprising:
a slide rail including:
   a lower rail disposed on a vehicle component side;
   an upper rail disposed on a seat body side and supported by the lower rail so as to be movable in a sliding manner relative to the lower rail; and
   a cap provided in a longitudinal rear end of the upper rail, wherein
the slide rail has a space that receives the cap therein, the space being provided between a lower face portion of the lower rail and an upper face portion of the upper rail, the space being further provided between a pair of side face portions of the upper rail, wherein the lower face portion faces the vehicle component side and the upper face portion faces the seat body side, when the upper rail is placed in a rearmost position within a slidable range where the upper rail is movable in the sliding manner relative to the lower rail, the slide rail has a positional relationship in which the longitudinal rear end of the upper rail is placed on a rear side of the lower rail relative to a longitudinal rear end of the lower rail, the upper rail is inserted into the lower rail such that, in a transverse sectional view of the slide rail perpendicular to a longitudinal direction of the slide rail, the upper rail and the lower rail overlap outside of the space in the transverse sectional view of the slide rail, the cap provided in the upper rail integrally includes a base portion adjacent to the longitudinal rear end of the upper rail provided with the cap, a first deformation prevention portion extending into the space from the base portion toward a longitudinal center of the upper rail provided with the cap, the first deformation prevention portion being provided between the pair of side face portions within the space such that the first deformation prevention portion extends into an interior of the lower rail and at least fills, in the transverse sectional view of the slide rail, a part of the space between where the upper rail and the lower rail laterally overlap to restrain deformation of the upper rail, and a claw portion directly connected to the first deformation prevention portion and locked to a hole portion provided on the upper rail, and when the upper rail is placed in the rearmost position within the slidable range, the first deformation prevention portion is placed in vicinity to the longitudinal rear end of the lower rail in the longitudinal direction of the slide rail.

9. The vehicle seat according to claim 8, wherein
when the upper rail is placed in the rearmost position within the slidable range, the first deformation prevention portion is disposed so as to longitudinally overlap with at least part of a fixing area between the longitudinal rear end of the lower rail and a fixing member fixing the rear side of the lower rail to a vehicle component on the vehicle component side.

10. The vehicle seat according to claim 8, wherein
the first deformation prevention portion is disposed so as to longitudinally overlap with at least part of an attachment area where a seat body on the seat body side is attached to the upper face portion of the upper rail.

11. The vehicle seat according to claim 8, wherein
the base portion is provided with a second deformation prevention portion restraining deformation of the longitudinal rear end of the upper rail.

12. The vehicle seat according to claim 8, wherein
the cap includes a connection portion that connects the base portion to the first deformation prevention portion such that the base portion and the first deformation prevention portion are spaced from one another in the longitudinal direction of the slide rail, and
the connection portion is thinner than the base portion in the transverse sectional view perpendicular to the longitudinal direction of the slide rail to allow the claw portion to be elastically deformed toward the connection portion.

* * * * *